United States Patent
Ram et al.

(10) Patent No.: US 9,215,754 B2
(45) Date of Patent: Dec. 15, 2015

(54) WI-FI VIRTUAL PORT UPLINK MEDIUM ACCESS CONTROL

(75) Inventors: Mohan Ram, Banashankari (IN); Sung-Wook Han, Sunnyvale, CA (US); Berend Dunsbergen, San Jose, CA (US); Vaduvur Bharghavan, Morgan Hill, CA (US); Joseph Epstein, Pleasanton, CA (US)

(73) Assignee: Menu Networks, Sunnyvale, CA (US)

( * ) Notice: Subject to any disclaimer, the term of this patent is extended or adjusted under 35 U.S.C. 154(b) by 274 days.

(21) Appl. No.: 13/426,703

(22) Filed: Mar. 22, 2012

(65) Prior Publication Data

US 2012/0307792 A1 Dec. 6, 2012

Related U.S. Application Data

(63) Continuation-in-part of application No. 12/913,584, filed on Oct. 27, 2010, now Pat. No. 8,787,309, which is a continuation of application No. 11/715,287, filed on Mar. 7, 2007, now Pat. No. 7,826,426.

(51) Int. Cl.
*H04L 12/26* (2006.01)
*H04W 4/00* (2009.01)
(Continued)

(52) U.S. Cl.
CPC .............. *H04W 88/08* (2013.01); *H04L 43/08* (2013.01); *H04W 36/30* (2013.01);
(Continued)

(58) Field of Classification Search
CPC ..... H04W 74/00; H04W 36/00; H04W 88/08; H04W 36/30; H04W 16/10; H04W 72/048; H04W 74/006; H04W 74/06

USPC .......... 709/124, 227, 229; 455/525, 436, 439, 455/526, 452.1, 509; 370/338, 343, 322, 370/315, 400, 94, 60, 329, 252, 331; 726/3, 726/5, 15
See application file for complete search history.

(56) References Cited

U.S. PATENT DOCUMENTS 3,956,749 A 5/1976 Magorian
5,038,151 A 8/1991 Kaminski
(Continued)

FOREIGN PATENT DOCUMENTS

JP 2005311580 11/2005
JP 2006229972 8/2006

OTHER PUBLICATIONS

IEEE Std 802.11—"IEEE Standard for Information technology—Telecommunications and information exchange between systems—Local and metropolitan area networks—Specific requirements—Part 11: Wireless LAN Medium Access Control (MAC) and Physical Layer (PHY) Specifications"—2007, p. 80-298.*
(Continued)

*Primary Examiner* — Alpus H Hsu
*Assistant Examiner* — Camquyen Thai
(74) *Attorney, Agent, or Firm* — Law Office of Dorian Cartwright

(57) ABSTRACT

Uplink medium access control on per-wireless device level. An access point sends a beacon frame to a wireless device. The beacon frame includes a BSSID that is unique to the wireless device. The beacon frame also includes embedded uplink configurations specifying uplink medium access for the wireless device. In one embodiment, a controller recognizes a device or user associated with the device, and sends corresponding uplink configurations for embedding in a subsequent beacon frame.

18 Claims, 11 Drawing Sheets

(51) Int. Cl.
*H04W 36/00* (2009.01)
*H04W 72/00* (2009.01)
*H04B 7/00* (2006.01)
*H04W 88/08* (2009.01)
*H04W 36/30* (2009.01)
*H04W 72/04* (2009.01)
*H04W 74/00* (2009.01)
*H04W 16/10* (2009.01)
*H04W 74/06* (2009.01)

(52) U.S. Cl.
CPC ......... *H04W 72/048* (2013.01); *H04W 74/006* (2013.01); *H04L 12/2697* (2013.01); *H04W 16/10* (2013.01); *H04W 74/06* (2013.01)

(56) References Cited

U.S. PATENT DOCUMENTS

| | | |
|---|---|---|
| 5,125,108 A | 6/1992 | Talwar |
| 5,177,788 A | 1/1993 | Schanning et al. |
| 5,337,397 A | 8/1994 | Lebby et al. |
| 5,519,706 A | 5/1996 | Bantz et al. |
| 5,539,747 A * | 7/1996 | Ito et al. ............... 370/235 |
| 5,884,272 A | 3/1999 | Walker et al. |
| 5,966,094 A | 10/1999 | Ward et al. |
| 6,023,621 A | 2/2000 | Jackson et al. |
| 6,658,047 B1 | 12/2003 | Komulainen et al. |
| 6,721,334 B1 | 4/2004 | Ketcham |
| 6,728,603 B2 | 4/2004 | Pruzan et al. |
| 6,760,318 B1 | 7/2004 | Bims |
| 6,788,658 B1 | 9/2004 | Bims |
| 6,839,038 B2 | 1/2005 | Weinstein |
| 6,877,043 B2 | 4/2005 | Mallory et al. |
| 6,894,649 B2 | 5/2005 | Ostervall |
| 6,933,909 B2 | 8/2005 | Theobold |
| 6,950,629 B2 | 9/2005 | Nagy |
| 6,954,177 B2 | 10/2005 | Channabassapa et al. |
| 6,978,158 B2 | 12/2005 | Ghavami |
| 6,999,802 B2 | 2/2006 | Kim |
| 7,057,566 B2 | 6/2006 | Theobold |
| 7,171,215 B2 | 1/2007 | Khouaja et al. |
| 7,194,008 B2 | 3/2007 | Chu et al. |
| 7,197,308 B2 | 3/2007 | Singhal et al. |
| 7,277,728 B1 | 10/2007 | Kauhanen |
| 7,319,685 B2 | 1/2008 | Kim et al. |
| 7,333,455 B1 | 2/2008 | Bolt et al. |
| 7,355,986 B2 * | 4/2008 | Vanderveen et al. ......... 370/255 |
| 7,359,362 B2 | 4/2008 | King et al. |
| 7,400,604 B2 | 7/2008 | Lee et al. |
| 7,403,506 B2 | 7/2008 | Lee et al. |
| 7,406,319 B2 | 7/2008 | Kostic et al. |
| 7,420,942 B2 | 9/2008 | Wang |
| 7,426,388 B1 | 9/2008 | Wright et al. |
| 7,430,397 B2 | 9/2008 | Suda et al. |
| 7,433,722 B2 | 10/2008 | Sakamoto et al. |
| 7,444,425 B2 | 10/2008 | Lehmann, Jr. et al. |
| 7,466,981 B1 | 12/2008 | Abdelmahid et al. |
| 7,499,673 B2 | 3/2009 | Saliga et al. |
| 7,515,909 B2 | 4/2009 | Jain et al. |
| 7,555,287 B1 | 6/2009 | Heinonen et al. |
| 7,630,402 B2 | 12/2009 | Un et al. |
| 7,630,403 B2 | 12/2009 | Ho et al. |
| 7,693,513 B2 | 4/2010 | Chou |
| 7,797,016 B2 * | 9/2010 | Eran et al. ............... 455/525 |
| 7,826,426 B1 | 11/2010 | Bharghavan et al. |
| 7,843,910 B2 | 11/2010 | Loughran et al. |
| 8,027,637 B1 | 9/2011 | Bims |
| 8,090,374 B2 | 1/2012 | Rezvani et al. |
| 8,472,359 B2 | 6/2013 | Bharghavan et al. |
| 8,510,801 B2 * | 8/2013 | Majmundar et al. ............... 726/3 |
| 8,787,309 B1 | 7/2014 | Bharghavan et al. |
| 2002/0022483 A1 | 2/2002 | Thompson et al. |
| 2002/0060995 A1 | 5/2002 | Cervello et al. |
| 2002/0086640 A1 | 7/2002 | Belcher et al. |
| 2002/0112008 A1 | 8/2002 | Christenson et al. |
| 2002/0147031 A1 | 10/2002 | Hood |
| 2002/0181629 A1 | 12/2002 | Shibata |
| 2003/0162546 A1 | 8/2003 | Jordan |
| 2003/0198305 A1 | 10/2003 | Taylor et al. |
| 2003/0199247 A1 | 10/2003 | Striemer |
| 2003/0206532 A1* | 11/2003 | Shpak ............... 370/322 |
| 2003/0206535 A1 | 11/2003 | Shpak |
| 2003/0207697 A1 | 11/2003 | Shpak |
| 2003/0207698 A1 | 11/2003 | Shpak |
| 2003/0207699 A1 | 11/2003 | Shpak |
| 2003/0236103 A1 | 12/2003 | Tamaki et al. |
| 2004/0051668 A1 | 3/2004 | Chang |
| 2004/0054774 A1* | 3/2004 | Barber et al. ............... 709/224 |
| 2004/0063455 A1 | 4/2004 | Eran et al. |
| 2004/0121770 A1 | 6/2004 | Tigerstedt et al. |
| 2004/0141617 A1 | 7/2004 | Volpano |
| 2004/0156399 A1 | 8/2004 | Eran |
| 2004/0183726 A1 | 9/2004 | Theobald |
| 2004/0185904 A1 | 9/2004 | Yamakita |
| 2004/0235453 A1 | 11/2004 | Chen et al. |
| 2005/0054370 A1 | 3/2005 | Shpak |
| 2005/0111405 A1 | 5/2005 | Kanterakis |
| 2005/0122919 A1 | 6/2005 | Touag |
| 2005/0135321 A1 | 6/2005 | Sharony |
| 2005/0152314 A1 | 7/2005 | Sun et al. |
| 2005/0153713 A1 | 7/2005 | Sharony |
| 2005/0156794 A1 | 7/2005 | Theobald et al. |
| 2005/0156799 A1 | 7/2005 | Theobald |
| 2005/0180367 A1* | 8/2005 | Dooley et al. ............... 370/338 |
| 2005/0195110 A1 | 9/2005 | Lin et al. |
| 2005/0219143 A1 | 10/2005 | Schadler et al. |
| 2005/0220048 A1 | 10/2005 | Lee et al. |
| 2005/0238054 A1 | 10/2005 | Sharma |
| 2005/0261970 A1 | 11/2005 | Vucina et al. |
| 2006/0002331 A1 | 1/2006 | Bhagwat et al. |
| 2006/0025127 A1 | 2/2006 | Cromer et al. |
| 2006/0049987 A1 | 3/2006 | Herrick |
| 2006/0056443 A1 | 3/2006 | Tao et al. |
| 2006/0098613 A1 | 5/2006 | Kish et al. |
| 2006/0111112 A1 | 5/2006 | Maveddat |
| 2006/0132360 A1 | 6/2006 | Caimi et al. |
| 2006/0203819 A1 | 9/2006 | Farinacci et al. |
| 2006/0215691 A1 | 9/2006 | Kobayashi et al. |
| 2006/0221993 A1 | 10/2006 | Liao et al. |
| 2006/0281500 A1 | 12/2006 | Huang et al. |
| 2007/0014267 A1 | 1/2007 | Lam et al. |
| 2007/0026807 A1 | 2/2007 | Kish |
| 2007/0117514 A1 | 5/2007 | Gainey et al. |
| 2007/0165610 A1 | 7/2007 | Tseng et al. |
| 2007/0195725 A1 | 8/2007 | Iino et al. |
| 2007/0213071 A1 | 9/2007 | Hwang |
| 2008/0014956 A1 | 1/2008 | Balasubramanian |
| 2008/0102835 A1 | 5/2008 | Zhao et al. |
| 2008/0112373 A1 | 5/2008 | Shpak |
| 2008/0153497 A1 | 6/2008 | Kalhan |
| 2008/0165866 A1 | 7/2008 | Teo et al. |
| 2008/0167093 A1 | 7/2008 | Nagano et al. |
| 2008/0212535 A1 | 9/2008 | Karaoguz et al. |
| 2008/0242305 A1 | 10/2008 | Kahlert et al. |
| 2008/0287130 A1 | 11/2008 | Laroia et al. |
| 2009/0022127 A1 | 1/2009 | Traynor et al. |
| 2009/0023434 A1 | 1/2009 | Trainor et al. |
| 2009/0061873 A1 | 3/2009 | Bao et al. |
| 2009/0061879 A9 | 3/2009 | Gallagher et al. |
| 2009/0111472 A1 | 4/2009 | Promenzio |
| 2009/0252165 A1 | 10/2009 | Zhang et al. |
| 2010/0080151 A1 | 4/2010 | Proctor et al. |
| 2011/0040969 A1 | 2/2011 | Yao et al. |
| 2011/0188484 A1 | 8/2011 | Reznik et al. |
| 2011/0305217 A1* | 12/2011 | Seok ............... 370/329 |
| 2012/0307792 A1 | 12/2012 | Ram et al. |
| 2012/0314696 A1 | 12/2012 | Liu |
| 2012/0317619 A1 | 12/2012 | Dattagupta et al. |
| 2013/0148609 A1 | 6/2013 | Ram et al. |

(56) References Cited

U.S. PATENT DOCUMENTS

| | | |
|---|---|---|
| 2013/0188539 A1 | 7/2013 | Han et al. |
| 2014/0112322 A1 | 4/2014 | Ram et al. |
| 2014/0126466 A1 | 5/2014 | Hamdi et al. |

OTHER PUBLICATIONS

Amir. "Fast Handoff for Seamless Wireless Mesh Networks." MobiSys '06, Jun. 19-22, 2006, pp. 83-95, ACM, Uppsala, Sweden.
Business Wire. "Meru Networks Delivers Industry's Only Zero-Loss Mobility Across WLAN Access Points and IP Subnets." Jun. 21, 2004, pp. 1-2.
Chen et al. "A Seamless Handoff Mechanism for OHCP-Based IEEE 802.11 WLANS." IEEE Communications Letters, Aug. 2007, pp. 665-667, vol. 1, No. 8.
Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.
Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).
Chui et al. "An Access Point Coordination System for Improved VoIP/WLAN Handover Performance." IEEE, 2006, pp. 501-505.
Fan et al. "Managing Heterogeneous Access Networks." 32nd IEEE Conference on Local Computer Networks, 2007, pp. 651-658, IEEE 2007, pp. 651-658.
Finneran. "Can WLAN switches support voice? Today's controllers offer key security and QoS capabilities, but as always, the devil's in the details." Business Communications Review, Oct. 2006, pp. 42-47.
Habib et al. "Multi-antenna techniques for OFDM based WLAN." Proceedings of First International Conference on Next-Generation Wireless Systems, Jan. 2006, pp. 186-190.
Huang et al. "Incorporating AP Selection and Call Admission Control for Seamless Handoff Procedure." Proceedings of the International Conference on Computer and Communication Engineering 2008, pp. 823-826.
Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.
Hur et al. "A Distributed-Request-Based Diffserv CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.
IEEE Std 802. 11-1997 Information Technology—telecommunications and Information exchange between systems—Local and Metropolitan Area Networks—specific Requirements—part 11: Wireless Lan Medium Access Control (MAC) and Physical Layer (PHY) Specifications, IEEE Std 802.11-1997, vol., No., pp. i-445, Nov. 18, 1997.
IEEE. "Part 11: Wireless LAN Medium Access Control (MAC) and Physical Layer (PHY) specifications." IEEE Std. 802.11, 1999 Edition (R2003), 2003, vol. No. pp. i-513.
Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).
Zhou et al. "A Seamless Handoff Scheme for Mobile IP." 2006 IEEE 63rd Vehicular Technology Conference, VTC 2006-Spring, May 7-Jul. 10, 2006, pp. 927-931, IEEE. (Abstract).
Kist. "Instant Handoffs for Wireless Infrastructure Meshed Networks." Proceedings of the 2008 Australasian Telecommunication Networks and Applications Conference, 2008, pp. 288-293.
Kitahara et al. "A base station adaptive antenna for downlink transmission in a OS-COMA system." IEEE 51 st Vehicular Technology Conference Proceedings, 2000 (abstract).
Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.
LV. "Intelligent Seamless Vertical Handoff Algorithm for the Next Generation Wireless Networks." Mobilware '08, Feb. 12-15, 2008, pp. 1-10, Innsbruck, Austria.
Mahler et al. "Design and optimisation of an antenna array for WiMAX base stations." IEEE/ACES International Conference on Wireless Communications and Applied Computational Electromagnetics, 2005 (abstract).
Mannion. "Foundry Networks enters WLAN management fray—Bets on integration with wired infrastructure, market timing to take on Cisco." Electronic Engineering Times, Sep. 8, 2003, p. 32, No. 1286.
Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).
Manodham et al. "A Seamless Handoff Scheme with New AP Module for Wireless LANs support VoIP." Proceedings of the 2005 Symposium on Applications and the Internet, 2006, pp. 1-6, IEEE.
Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.
Miaris et al. "On the base stations antenna system design for mobile communications." Electrical Engineering, 2006, vol. 88, pp. 157-163.
Miura et al. "Study of array pattern tuning method using hybrid genetic algorithms for figure-8 satellite's earth station antenna." Asia-Pacific Microwave Conference Proceedings, 2000 (abstract).
Murray et al. "Intelligent Access and Mobility Management in Heterogeneous Wireless Networks Using Policy." ACM First International Workshop on Information and Communication Technologies, 2003, pp. 181-186.
Ponnapalli et al. "Design and packaging of antennas for wireless systems." Proceedings of Electrical Performance of Electrical Packaging, 1995 (abstract).
Rist et al. "Wireless LANS—Look, MA . . . No Wires—Wireless networking products prove they are finally ready for prime time." Internetweek, Mar. 20, 2000, p. 41, No. 805, CMP Media, Inc.
Sarolic. "Base station antenna near-field radiation pattern distortion analysis." Transactions on Engineering Sciences, 2003, pp. 1-10, vol. 41, WIT Press.
Sattari et al. "Seamless Handover Between WLAN and UMTS." 2004 IEEE 59th Vehicular Technology Conference, VTC2004-Spring: Towards a Global Wireless World, May 17-19, 2004, pp. 3035-3038, IEEE. (Abstract).
Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).
Wei et al. "Seamless Handoff Support in Wireless Mesh Networks." 2006, pp. 1-8, IEEE.
Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).
Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.
Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).
Zhou et al. A Seamless Handoff Scheme for Mobile IP. IEEE Vehicular Technology Conference, 2006, pp. 927-931, vol. 2.

* cited by examiner

WI-FI VIRTUAL PORT UPLINK MEDIUM ACCESS CONTROL

CROSS-REFERENCE TO RELATED APPLICATIONS

This application claims the benefit of priority under 35 U.S.C. 120 as a continuation-in-part to co-pending and commonly-assigned U.S. application Ser. No. 12/913,584, filed Oct. 27, 2010, entitled SEAMLESS MOBILITY IN WIRELESS NETWORKS, by Vaduvur Bharghavan et al., which claims priority to U.S. application Ser. No. 11/715,287, filed Mar. 7, 2007, entitled SEAMLESS MOBILITY IN WIRELESS NETWORKS, by Vaduvur Bharghavan et al., the contents of each which are hereby incorporated by reference in their entirety.

FIELD OF THE INVENTION

The invention relates generally to network administration, and more specifically, to controlling an amount of uplink access of a wireless device.

BACKGROUND OF THE INVENTION

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Wireless devices complying with standards such as IEEE 802.11 have control over how a connection to wireless network is made. Namely, a wireless device selects an access point among a number of access points that have sent out beacons advertising a presence. The beacon includes a BSSID (Basic Service Set Identifier) as an identifier of the access point. In turn, the wireless device sends data packets which include the BSSID of the intended access point. Unintended access points receiving a transmission merely ignore the data packets.

Problematically, wireless devices also inherently have control over uplink accesses to wireless networks. An uplink access is necessary for sending data to the wireless network from a wireless device, such as URL requests, queries, control information, and the like. Although an access point can control an amount of data over downlink accesses, there is no control built into the protocol for uplink accesses of, for example, aggressive wireless devices. Consequentially, a wireless device can consume more than a fair amount of bandwidth on a network, or overburden a processing load of network components. This problem is exasperated for public hot spots or large companies that have a large amount of wireless devices connected at the same time. For example, the number of collisions can degrade channel quality when too many wireless devices uplink at the same time.

Besides having lack of control over aggressive wireless devices, the current protocols do not allow varying quality of service. In other words, a guest user or guest device is granted the same uplink access privileges as a critical user or critical device. As a result, a guest engaged in unproductive Internet surfing has the same media access rights as a company president presenting networked data in a board meeting.

A client running on a wireless device is not always desirable. For instance, guests connecting to a public hot spot for only one time would be burdened with the process of downloading and installing a client. Furthermore, many computer users are weary about malicious applications downloaded from the Internet.

What is needed is a technique to provide uplink access control for connected wireless devices. Further, the uplink access control should be extendable to a per-wireless device level. Finally, the technique requires no reconfiguration of a wireless device.

SUMMARY

To meet the above-described needs, methods, computer program products, and systems to provide uplink medium access control on per-wireless device level.

In an embodiment, a beacon frame is periodically sent to a wireless device. The beacon frame includes a BSSID that is unique to the wireless device. The beacon frame also includes embedded uplink configurations specifying uplink medium access for the wireless device. In one embodiment, a controller recognizes a device or user associated with the device, and sends uplink configurations for embedding in a subsequent beacon frame.

In another embodiment, uplink configurations are embedded to the Quiet Element field and/or the AIFS and eCWmin fields of a beacon sent from an access point to a wireless device. A uplink transmission sent from the wireless device complies with the uplink configurations of the modified beacon frame.

Based on changes in conditions, the uplink configurations can also be updated. The conditions can be derived from a wireless device, an access point, or any other component of the network. Furthermore, the conditions can be derived from metrics of a wireless network such as bandwidth utilization, packet flight time, and packet loss.

Advantageously, per device control of uplink medium access restores management capability to the network components rather than the devices connected thereto. Further, control is enforced on a wireless device without installing any application thereon.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems to control uplink access. Generally, uplink access relates to a wireless device (or mobile station) connected to a network that access to the communication channel in order to transmit data. For example, a wireless device connected to a wireless network can be remotely configured on-the-fly to limit uplink medium accesses during heavy traffic periods. Self-regulation is particularly valuable for wireless networks such as IEEE 802.11 type networks (e.g., a, b, g, or n) which do not support native regulation on uplink access. Furthermore, a virtual port for a wireless device provides seamless mobility by using a BSSID (that unique to a device.

Figure 1:
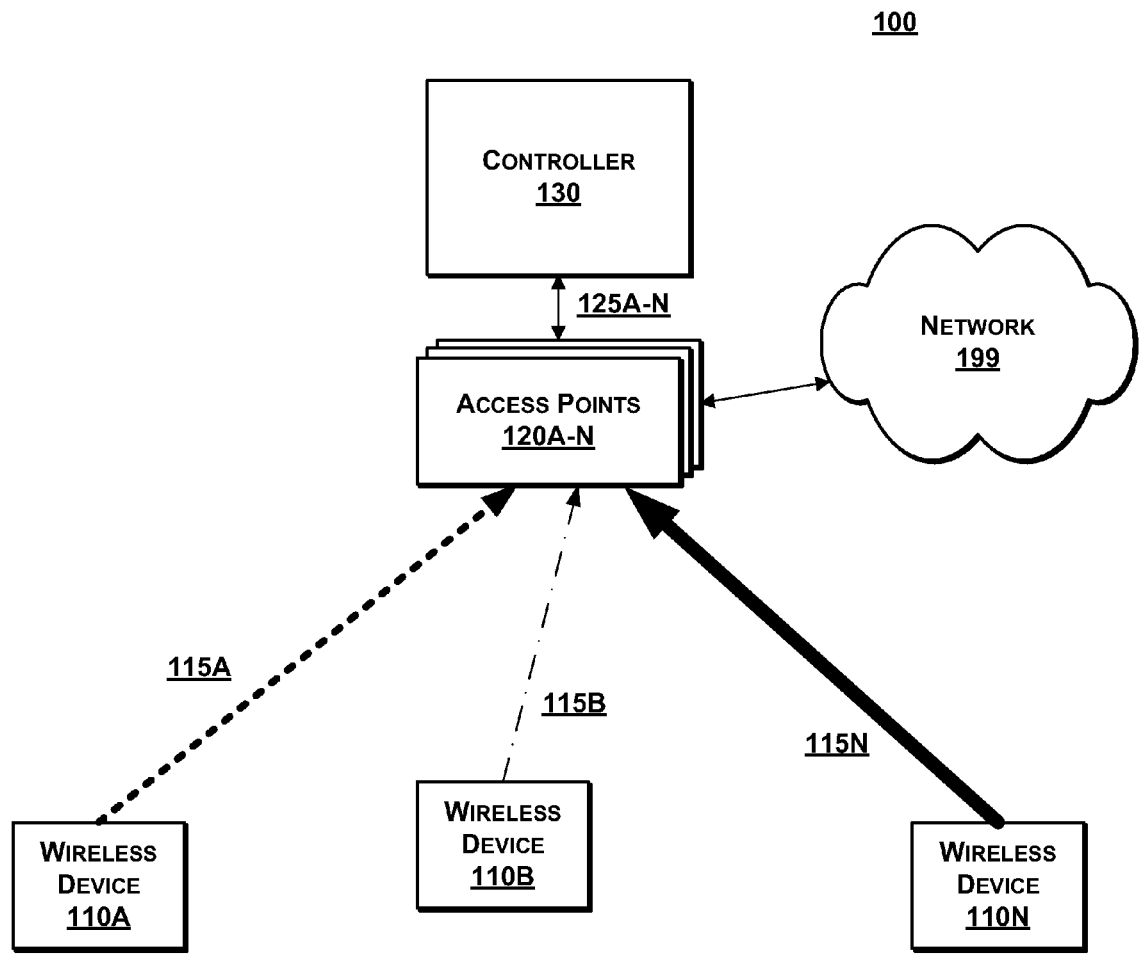
FIG. 1 is a high-level block diagram illustrating a system to control uplink access, according to one embodiment.

FIG. 1 is a high-level block diagram illustrating a system 100 to control uplink access, according to one embodiment. The system comprises wireless devices 110A-N, access points 120A-N, and a controller 13. The components can be coupled to a network 199, such as the Internet, a local network or a cellular network, through any suitable wired (e.g., Ethernet) or wireless (e.g., Wi-Fi or 3G) medium, or combination. In a preferred embodiment, the wireless devices 110A-N are coupled to the access points 120A-N through a wireless communication channel 115A-N while the access points 120A-N are coupled to the controller 130 through a wired network 125A-N. Other embodiments of communication channels are possible, including hybrid networks. Additional network components can also be part of the system 100, such as firewalls, virus scanners, routers, switches, application servers, databases, and the like. In general, the wireless devices 110A-N use communication channels 115A-C for uplink access to a network.

The wireless devices 110A-N can be, for example, a personal computer, a laptop computer, a tablet computer, a smart phone, a mobile computing device, an Internet appliance, or the like. No client is needed. The wireless devices 110A-N operate according to standards in which an access point is selected by the wireless devices 110A-N themselves. However, it is the access point that directs the wireless devices 110A-N into selecting a BSSID preferred by the controller. In one embodiment, an employee authenticates to a wireless network to access a corporate LAN to run streaming applications to modify remotely stored secure files. In another embodiment, a guest at a coffee shop accesses a public hot spot to watch stream videos stored on a public web site. The communications channels 115A-N each provide a preconfigured amount and/or frequency of uplink access. Embodiments of then wireless devices 110A-N are discussed in more detail below in association with FIG. 7.

The access points 120A-N include one or more individual access points that interact with wireless devices 110A-N to control medium access. The access points 120A-N can be set-up in various configurations to provide wireless coverage areas, examples of which are discussed below with respect to FIGS. 6A-C. The access points 120A-N can, in turn, be connected to a wired hub, switch or router connected to the network 199. In another embodiment, the functionality is incorporated into a switch or router. To implement uplink access control, the access points 120A-N modify one or more fields in beacons, including a Quiet Element and/or EDCA Parameters. In one embodiment, the access points 120A-N can identify the wireless device using a BSSID that is unique to one or more of the access points 120A-N. In this "personal cell" model or a "virtual port" model, a BSSID is maintain34ed at the access points 120A-N for each wireless device. The access points 120A-N appear to each wireless device as if they were a single access point that communicates with the device using that identifier. A wireless device selects that single access point as the one with which it will communicate. But the controller 130 selects on of the access points 120A-N for actually communicating with a wireless device, and might change that selected access point from time to time, without a wireless device having any knowledge. The remaining access points listing passively to communications when not selected by the controller 130 to facilitate communication. Further, the access points 120A-N can control uplink access behavior of the wireless devices 110A-N on a per-device level. Embodiments of the access point are set forth below in FIG. 8.

The controller 130 can communicate with each of the access points 120A-N to direct the uplink configurations for each of the wireless devices 110A-N. Moreover, the controller determines, in one embodiment, which access point should communicate with a particular one of the wireless devices 110A-N, among other things. Algorithms to initially set uplink configurations, to change uplink configurations, and to determine which access point provides the uplink configurations are all implementation-specific. In one example, the controller 130 varies uplink configurations based on a current load of the network (i.e., provide less access during heavy traffic and more during light traffic). In another example, the controller can discriminate access for particular users or groups of users (e.g., authenticated user, guest, suspicious wireless device, etc.), for particular types of computers (e.g., critical data server, rarely-accessed archival data storage, etc.), for particular types of traffic (streaming HD video, low bandwidth video, secure data, etc.), and the like. Additional embodiments of the controller 130 are discussed with respect to FIG. 9.

The component interactions are design parameters that vary in accordance with specific needs of a wireless networks. More specifically, the controller 130 direct all uplink configurations and BSSID associations across a wireless network. Alternatively, the access points 120A-N can be in communication for self-arbitration of BSSID associations and determination of uplink configurations. Other variations rely on a hybrid approach.

Figure 2:
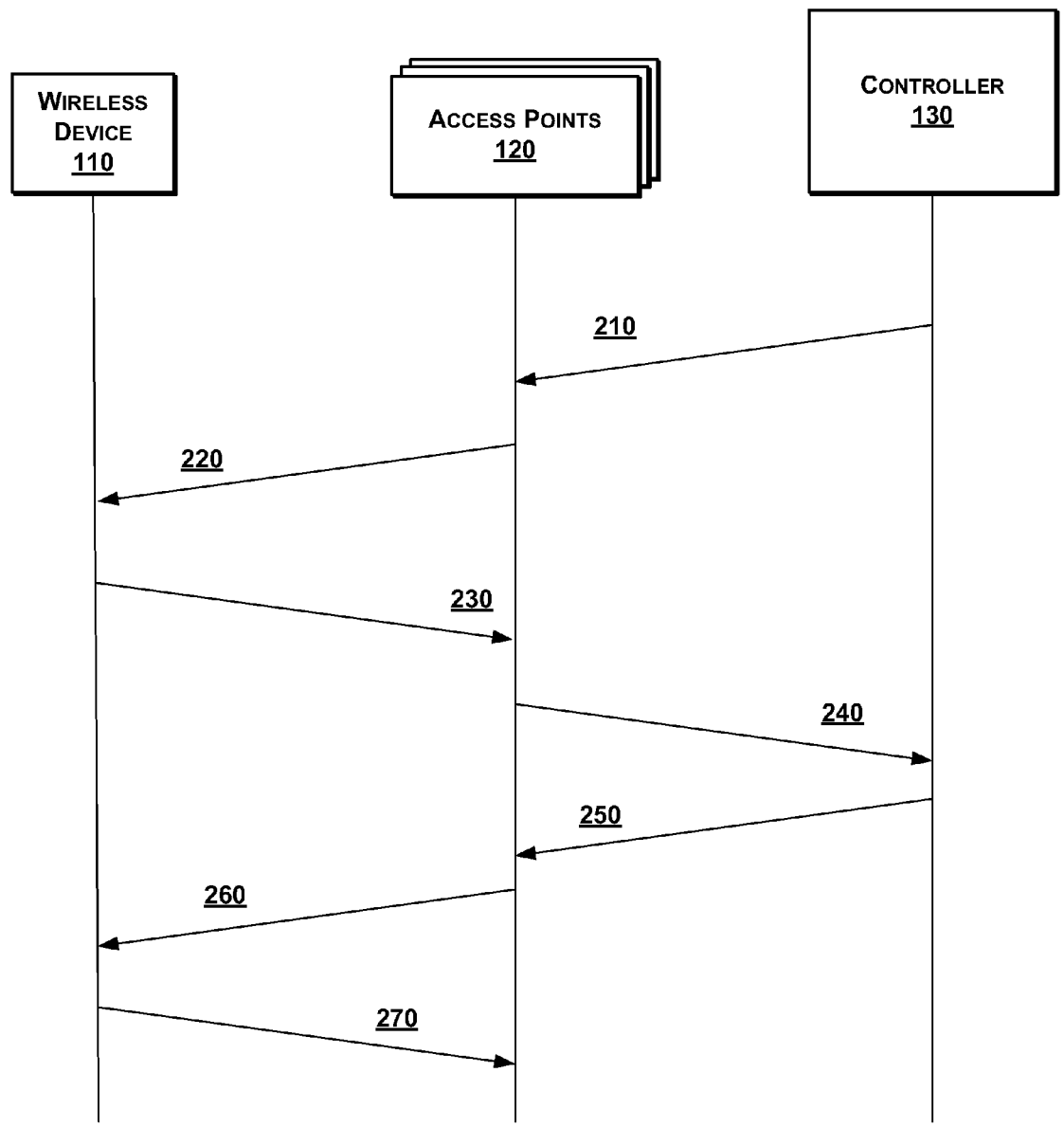
FIG. 2 is a sequence diagram illustrating interactions between components of the system of FIG. 1, according to one embodiment.
Figure 3:
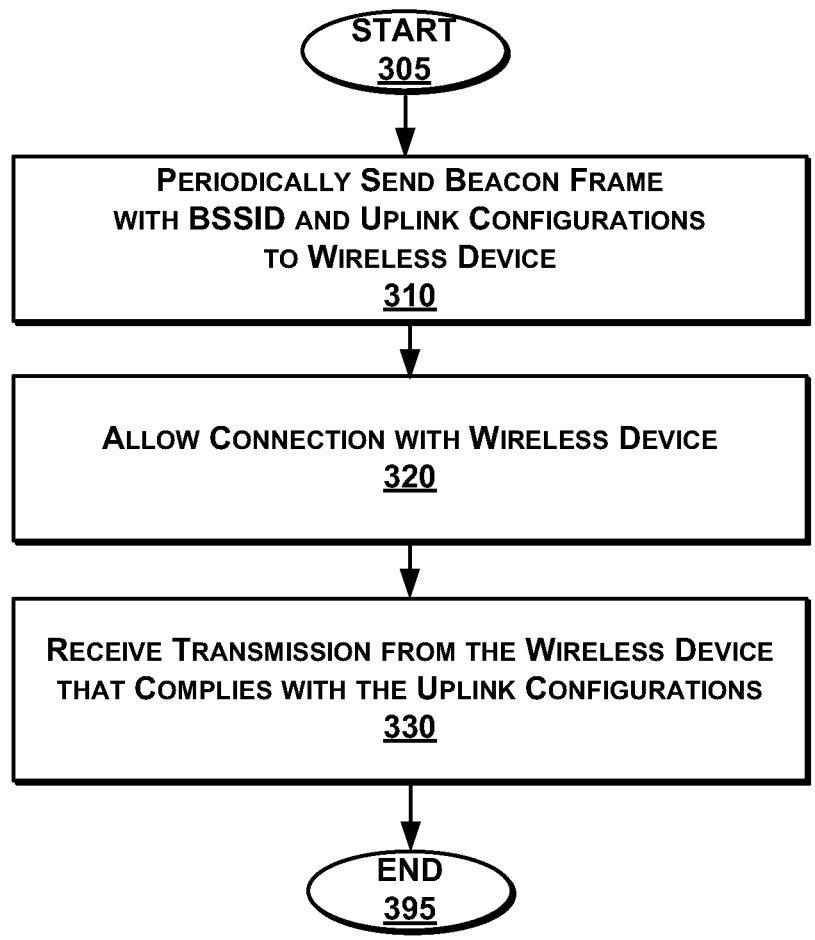
FIG. 3 is a block diagram illustrating a method for controlling uplink access from an access point of the system, according to one embodiment.
Figure 4:
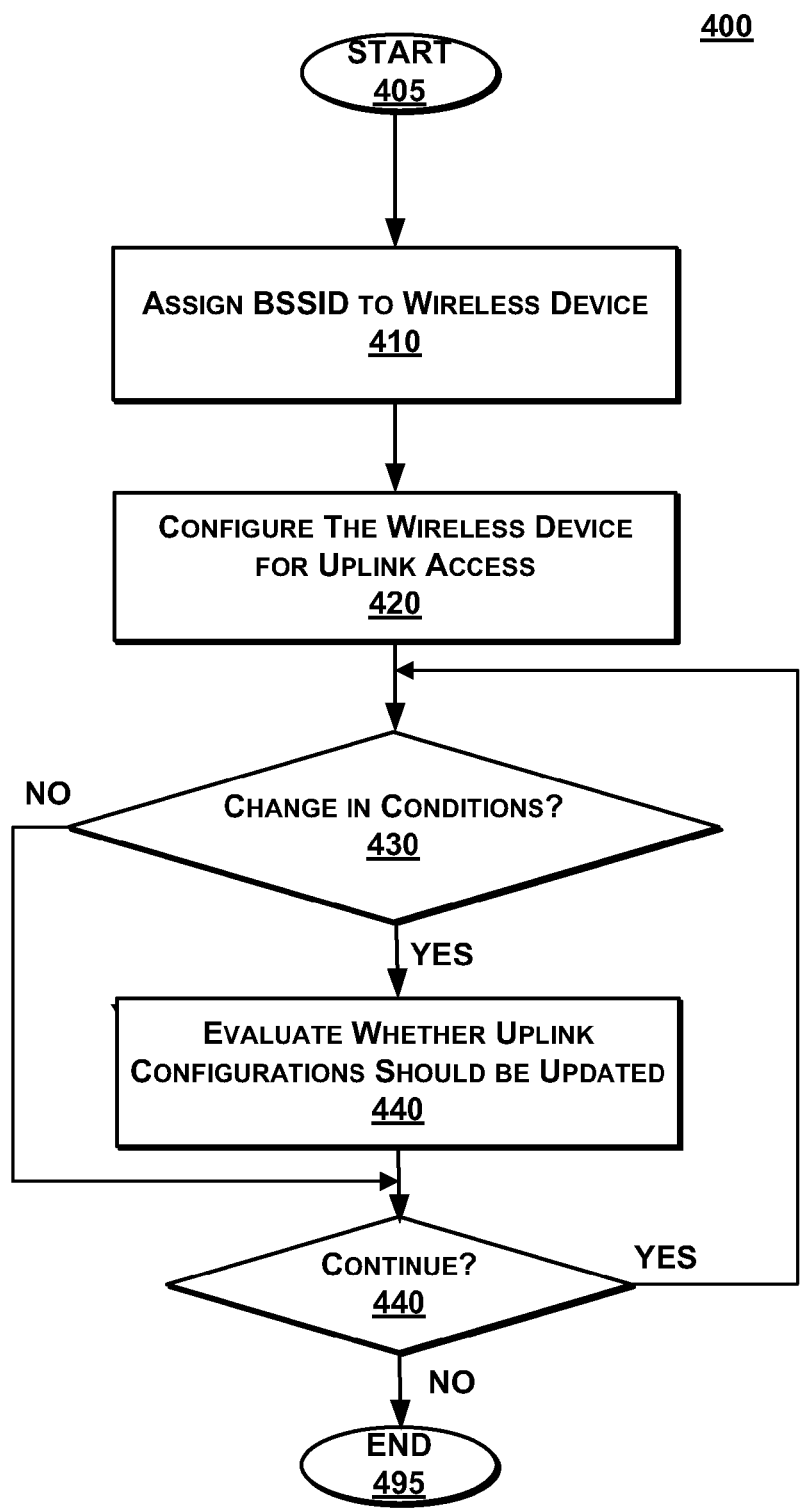
FIG. 4 is a block diagram illustrating a method for controlling uplink access from a controller of the system, according to one embodiment.
Figure 5:
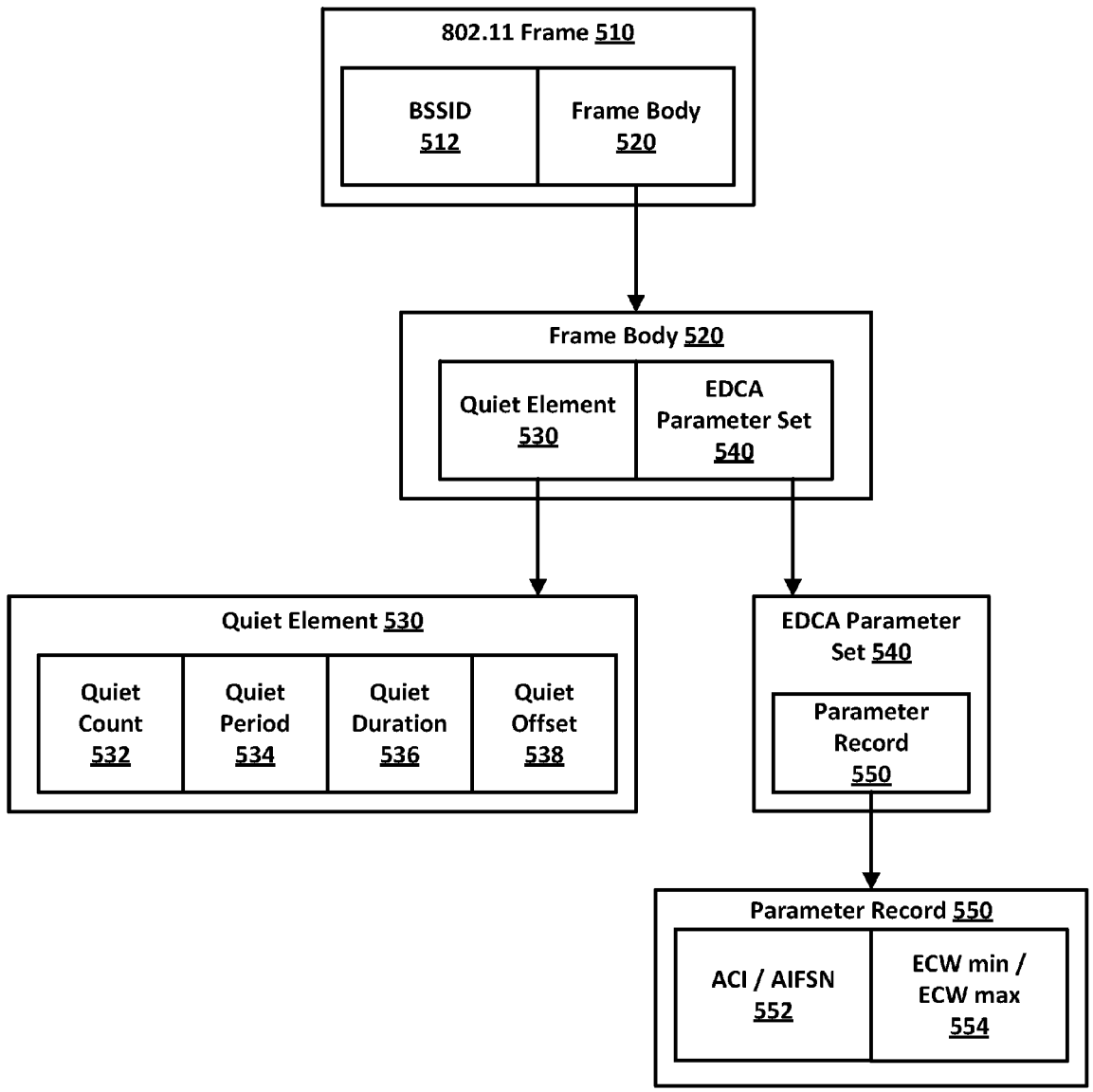
FIG. 5 is a schematic diagram illustrating an exemplary IEEE 802.11 network packet with uplink control configurations, according to one embodiment.

FIG. 2 is a sequence diagram illustrating interactions 200 between components of the system 100 of FIG. 1 to control uplink access, according to one embodiment. The interactions occur in accordance with IEEE 802.11 standards, as discussed below. An example of an 802.11 network packet configured for implementation herein is illustrated in FIG. 5. Methods occurring within the components of FIG. 2 are illustrated in FIGS. 3 and 4.

At interaction 210, the controller sends assignments for the access points 120, including an assignment of BSSIDs to particular ones of the access points 120. At interaction 220 the access points 120 send beacons over a respective coverage area to make the BSSIDs available for connection. At interaction 230, a wireless device 110 that has received a beacon and wants to connect to a network sends a connection request, including a BSSID of the beacon.

In some embodiments, at step 240, the one or more of access points 120 receiving the connection request will respond by reporting an event to the controller 130. At step 250, the controller 130 will then respond with an indication of which of the access points 120 should respond to the connection request. At step 260, the selected access point sends uplink access configurations to the wireless device 110.

Finally, at step 270, the wireless device 110 connects to a communication channel in accordance with the uplink access configurations. In one embodiment, the uplink configurations are determined by the access points 120. In an alternative embodiment, the uplink configurations are determined by the controller 130. The access points 120 can send information to the controller for use in determining the uplink configurations. For example, statistics about network conditions (e.g., throughput, error rate, signal to noise ratio, number of connecting devices) and statistics about individual components (e.g., process load, memory or cache capacity) can affect the uplink configurations. The uplink configurations differ based on, for example, a user, a particular wireless device, a type of network traffic, and the like.

The illustrated interactions 200 of FIG. 2 are not intended to be limiting. As such, the interactions 210 to 270 can be a portion of steps from a longer process. Further, the interaction 220 in which an access point sends a beacon can be continuously repeated.

FIG. 3 is a block diagram illustrating a method 300 for controlling uplink access from an access point (e.g., the access points 120A-N) of the system 100, according to one embodiment. At step 310, a beacon frame with a BSSID and uplink configurations is sent to a wireless device, in one embodiment. Subsequent frames can also include further data associated with BSSID configuration and uplink configurations. The device-specific BSSIDs allow individual uplink access control at the per-device level. The uplink configurations enforce media access constraints on the wireless device. Because beacons are configured within standard protocols (e.g., IEEE 802.11), a client is not needed on a wireless device for control.

At step 320, a connection with a wireless device is allowed. In response to the beacon, a probe request is received from a wireless device as an attempt to connect. A particular access point designated to communicate with a wireless device then facilitates communications with a wireless network for a wireless device.

At step 330, a transmission from a communication channel access by a wireless device is received by an access point. The transmission, in one embodiment, occurs in compliance with the uplink access configurations. Some alternative embodiments reject transmissions that are out of compliance with the uplink configurations.

FIG. 4 is a block diagram illustrating a method 400 for controlling uplink access from a controller (e.g., the controller 130) of the system, according to one embodiment.

At step 410, an access point is selected to associate with a wireless device that has responded to a beacon. In one implementation, a controller selects an access point that received the response at the earliest point in time. In yet another implementation, a controller takes into account conditions on the network as a whole and/or conditions of individual network components to select an access point. An access point embeds the BSSID of a selected access point into beacon frames.

At step 420, a wireless device is configured for uplink access. Without the uplink configurations, communications would occur under standard IEEE 802.11-type standards. With the uplink configurations, behavior of the wireless device is under control of an access point and/or a controller. For example, a wireless device browsing the Internet for entertainment web sites can be restricted, while a wireless device streaming HD video with a guaranteed QoS (quality of service) can be granted additional bandwidth. Network conditions or conditions of a component can also affect the bandwidth allocation. An access point embeds the uplink configurations into beacon frames. For example, a Quiet Frame or an EDCA Parameter Set fields are modified for this purpose rather than an intended purpose of IEEE 802.11 standards (i.e., for spectrum or radio measurements).

At step 430, in response to a change in conditions, a new access point is selected for association with a wireless device at step 410. Exemplary changes in condition include a change in location of the wireless device (see FIGS. 6A-B), an imbalance in traffic load among access points, excessive downtime for an access point, a change in uplink access for a wireless device. In some embodiments, at step 440, in response to the change in conditions, new uplink access configurations are imposed on a wireless device. Additionally, a new access point can be selected at this point. However, no action is taken if a change in conditions is not significant enough.

In one implementation, a wireless device is unaware of which access point communication is conducted with. A controller sends a message to a first access point with instructions to discontinue communications with a wireless device, and also sends a message to a second access point with instructions to continue communications with the terminated wireless device. To a wireless device, communications appear as if they were continuing to originate from the first access point. The second access point maintains the same BSSID for the reconfiguration.

At step 440, a process continues until an event such as a power down, reset, or termination of an application.

FIG. 5 is a schematic diagram illustrating an exemplary IEEE 802.11 network data packet 500 with embedded uplink control configurations, according to one embodiment. The data packet 500 includes several fields, including a BSSID 512 and a Frame Body 520 fields. Other fields within the data packet 500 can include Frame Control, Duration, Address 1, SA, Sequence Control, HT Control, and FCE.

The BSSID 512 field enables the virtual port feature. More particularly, a BSSID used by a wireless device for connection to an access point is persistent. A controller can switch access points connected with the wireless device, without any changes to the wireless device. Under a system of the prior art, switches require a change in BSSID used by the wireless device.

The Frame Body 520 for a beacon frame includes a Quiet Element 530 and an EDCA Parameter Set 540 which are employed herein for uplink medium access control. Other fields with in the Frame Body 520 can include Timestamp, Beacon interval, Capability, Service Set Identifier (SSID), Supported rates, Frequency-Hopping (FH) Parameter Set, and DS Parameter Set.

The Quiet Element 530 has a Quiet Count 532 that sets a duration prior to which a quiet period will begin. A Quiet Period 534 indicates a number of beacon intervals between quiet periods. A Quiet Duration 536 sets a number of time units the quiet period lasts. Finally, a Quiet Offset 538 controls a number of time units after a beacon interval that the next quiet period will begin. In combination with the unique BSSID, the Quiet Element 530 is applied to restrict uplink medium accesses by forcing periods of no access. Also, the Quiet Element 530 may have Element ID and Length fields configured for other purposes.

The EDCA Parameter Set 540 includes a Parameter Record 550. Within the Parameter Record 550, a CW (contention window) 554 and an AIFS (arbitration inter-frame space) 552 are shortened for high priority packets. In another instance, the AIFS 552 and the eCWmin 554 in a beacon are set to a value higher than the default values (suggested values are AIFS=15 and eCWmin=9). The unique BSSID also allows these fields to control uplink access of a wireless device.

Figure 6A:
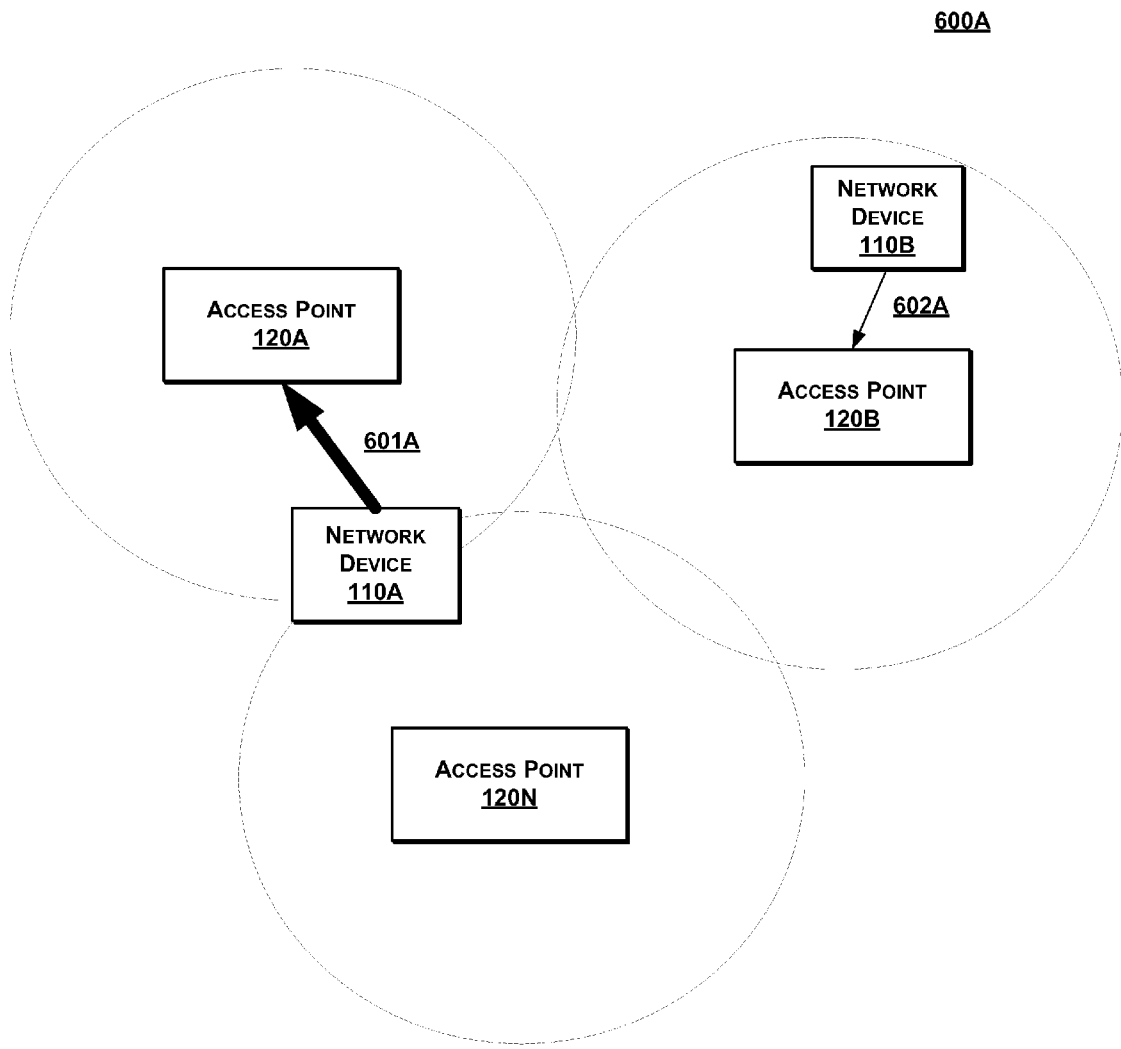
FIGS. 6A-C are schematic diagrams illustrating configurations of access points responsive to changing conditions, according to one embodiment.
Figure 6B:
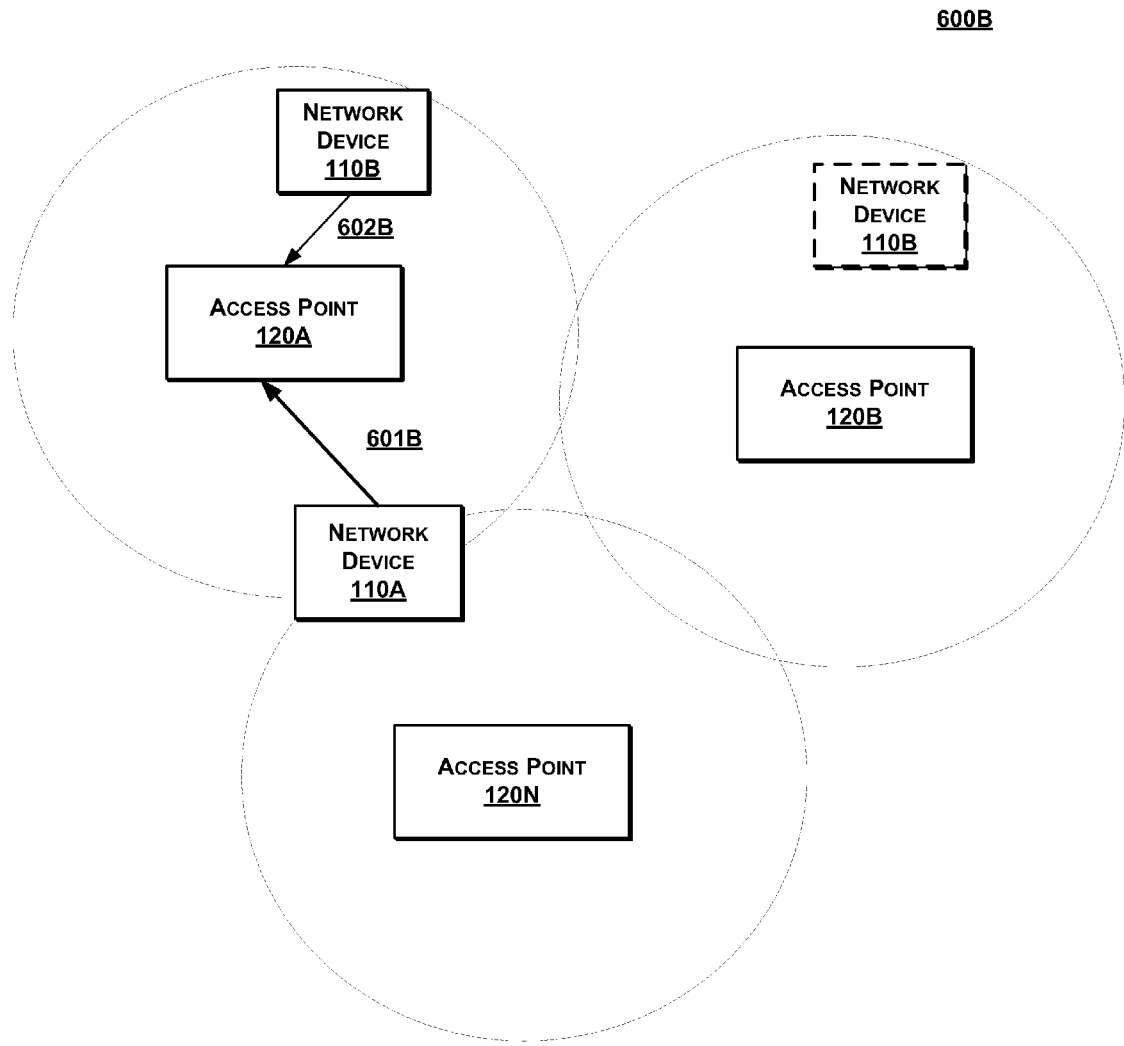
Figure 6C:
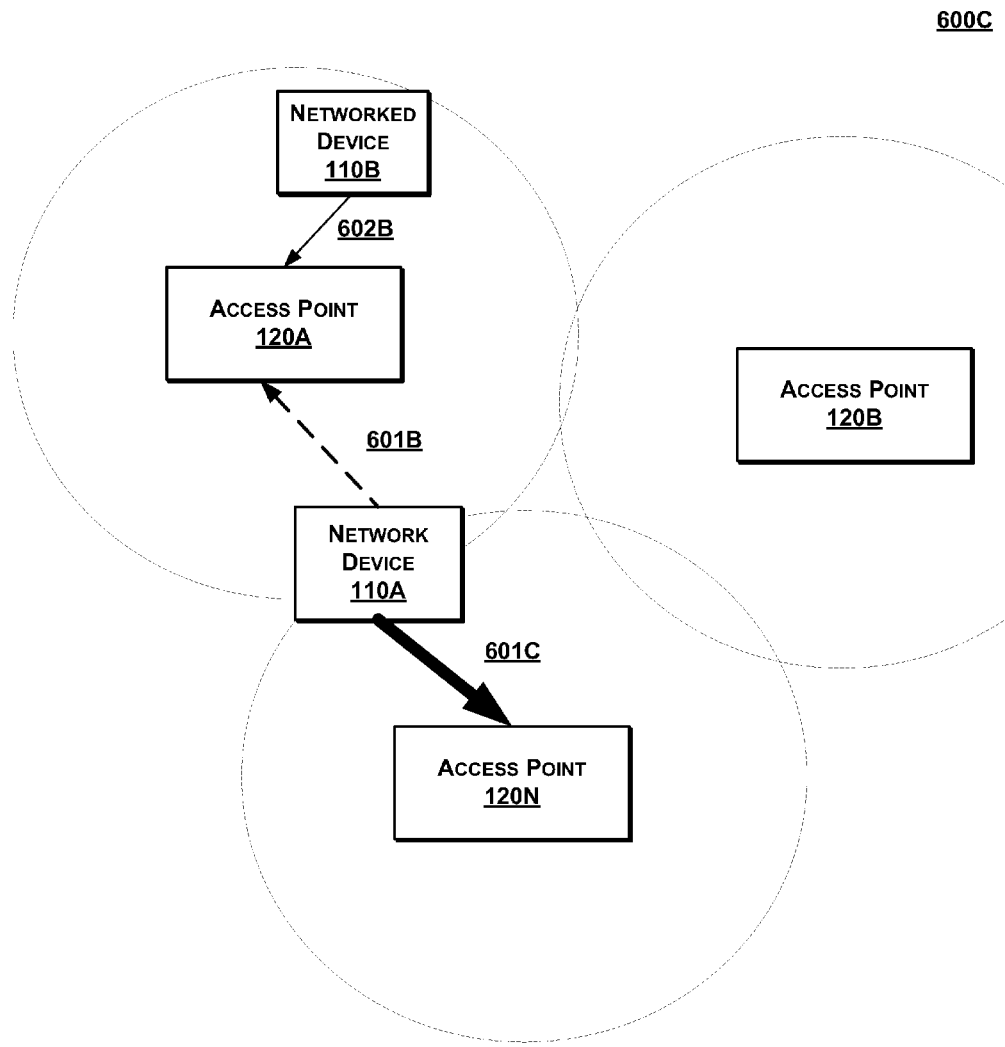

FIGS. 6A-C are schematic diagrams illustrating configurations of wireless devices responsive to a change in conditions, according to one embodiment. More specifically, in FIG. 6A, wireless device 110A is connected to access point 120A for uplink access via line 601A, while wireless device 110B is connected to access point 120B for uplink access via line 601B, at a first point in time. Here, the wireless device 110A is within range of both access points 120A and 120N, but the access point 120A is selected for the wireless device 110A. One reason for the selection can be lowest flight time for data packets. Further, an amount of uplink access is represented by the weight of line 601A.

At a later point in time, in FIG. 6B, wireless device 110B has changed locations such that it is within range of the access point 120A, and uses 602B for uplink accesses. In response to the change in other conditions, such as a change in the number of connected devices, a change in the bandwidth utilization, a change in the type of traffic, and the like, the access point 120A sends updated uplink configurations to wireless device 110A. In the case of FIG. 6B, the amount of uplink access has been reduced as illustrated by line 601B. In another embodiment, new uplink configurations for the wireless device 110A can change other behavior such as backoff and retry parameters.

At an even later point in time, in FIG. 6C, the wireless device 110A has been reassigned to access point 120N via line 601C. The flight time for data packets may still be less when sent to the access point 10A, but other conditions have triggered the change. For example, a controller can redistribute the processing load from the access point 120A to be partially absorbed by the access point 120N. Moreover, the access point 120N can handle the larger demand for uplink access by the wireless device 110A, resulting in an update in uplink configurations that increases the amount of uplink access allowed.

Figure 7:
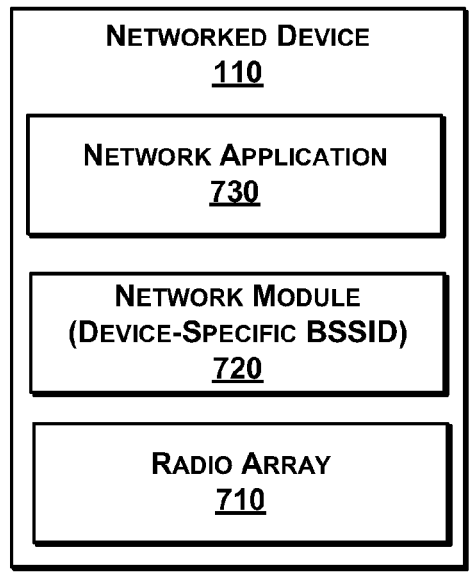
FIG. 7 is a more detailed block diagram illustrating a wireless device of the system, according to one embodiment.

FIG. 7 is a more detailed block diagram illustrating a wireless device 110 of the system 100, according to one embodiment. The wireless device 110 comprises a network application 710, a network module 720, and a radio array 730. The components can be implemented in hardware, software, or a combination of both.

The network application 710 can be any application executing on the wireless device 110 that makes use of network access in operation. Examples of the network application 710 include a network browser, a VOIP telephone service, a streaming video player, a database viewer, a VPN client, and the like.

The network module 720 exchanges data packs and unpacks data packets in accordance with, e.g., a TCP/IP stack. More particularly, IEEE 802.11-type packets can be generated and received as shown in FIG. 5 above.

The radio array 730 includes one or more transmit (Tx) and receive (Rx) antennas for communication with the physical layer. Some wireless devices 110 include separate antennae for IEEE 802.11a, IEEE 802.11b and IEEE 802.11n. Other wireless devices 110 includes several antenna dedicated for separate transmit and receive paths using the MIMO functionality of IEEE 802.11n.

Figure 8:
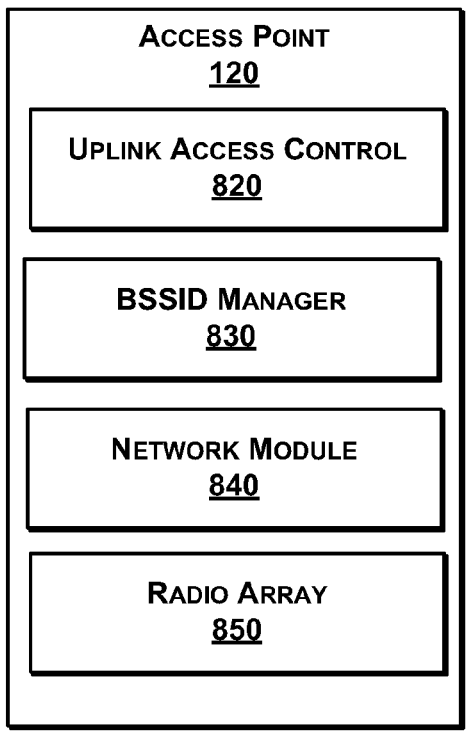
FIG. 8 is a more detailed block diagram illustrating an access point of the system, according to one embodiment.

FIG. 8 is a more detailed block diagram illustrating an access point 120 of the system 100, according to one embodiment. The access point 120 comprises an uplink access control 810, a BSSID manager 820, a network module 830, and a radio array 840. The components can be implemented in hardware, software, or a combination of both.

The uplink access control 810 manages uplink configurations of wireless devices connected to the access point 120. In one embodiment, the uplink access control 810 receives uplink configurations from a controller, and passes on them on to wireless devices. In another embodiment, the uplink access control 810 also determines or adjusts uplink configurations based on an input of conditions. The conditions can be network conditions, wireless device conditions, local conditions, time of day, or any other automatically determined or manually input factors.

The BSSID manager 820 tracks BSSID assignments to connected wireless devices. Some embodiments assign a unique BSSID to each wireless device which allows device level control of uplink access. The BSSID can be received from a controller that is in communication with other access points.

The network module 830 can be similar to the network module 720 of the wireless device 110 of FIG. 7. Furthermore, the network module 720 can provide hub, switching, or routing functionality depending on a network configurations. For example, data packets sent over an uplink from a wireless device can be forwarded to the Internet. Also, control packets can be received from a controller.

The radio array 840 can be similar to the radio array 730 of the wireless device 110 of FIG. 7.

Figure 9:
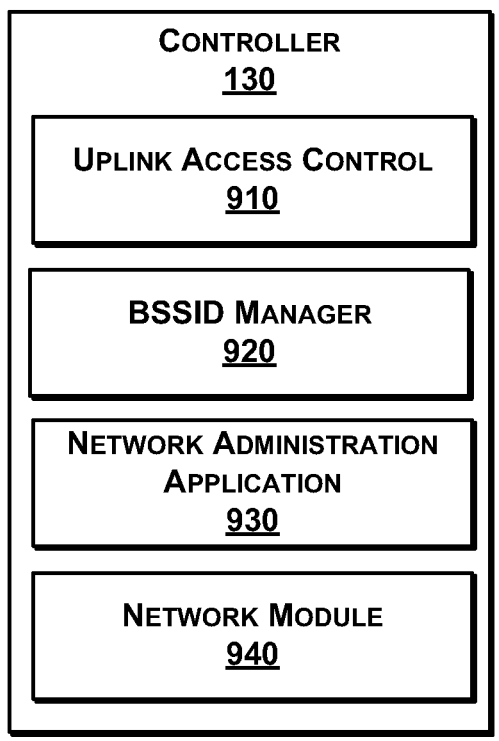
FIG. 9 is a more detailed block diagram illustrating a controller of the system, according to one embodiment.

FIG. 9 is a more detailed block diagram illustrating a controller 130 of the system 100, according to one embodiment. The controller 130 comprises an uplink access control 910, a BSSID manager 920, a network administration application 930, and a network module 940. The components can be implemented in hardware, software, or a combination of both.

The uplink access control 910 manages uplink access of wireless devices across several access points. As a result, even if the conditions at a particular access point would not trigger uplink controls, system-wide conditions can also be taken into account because the controller 130 has a broader view of the network than a single access point. Uplink configurations are determined using inputs from sensors, metrics, data statistics, clocks, manual configurations, and the like. Next, the uplink access control 910 passes uplink configurations to an access point that is communication with a wireless device which can be identified by BSSID, MAC address, or otherwise.

The BSSID manager 920 assigns particular BSSIDs to access points. As a wireless device travels around an aggregate coverage area of the access points, the BSSID can remove a BSSID from one access point, and assign it to a different access point to continue serving the wireless device. Besides locations, the BSSID manager 920 can make changes due to load balancing, type of network traffic, type of device, user privileges, and the like.

The network administration application 930, and the network module 940 can all be similar to the components of the access point 120 of FIG. 8.

Figure 10:
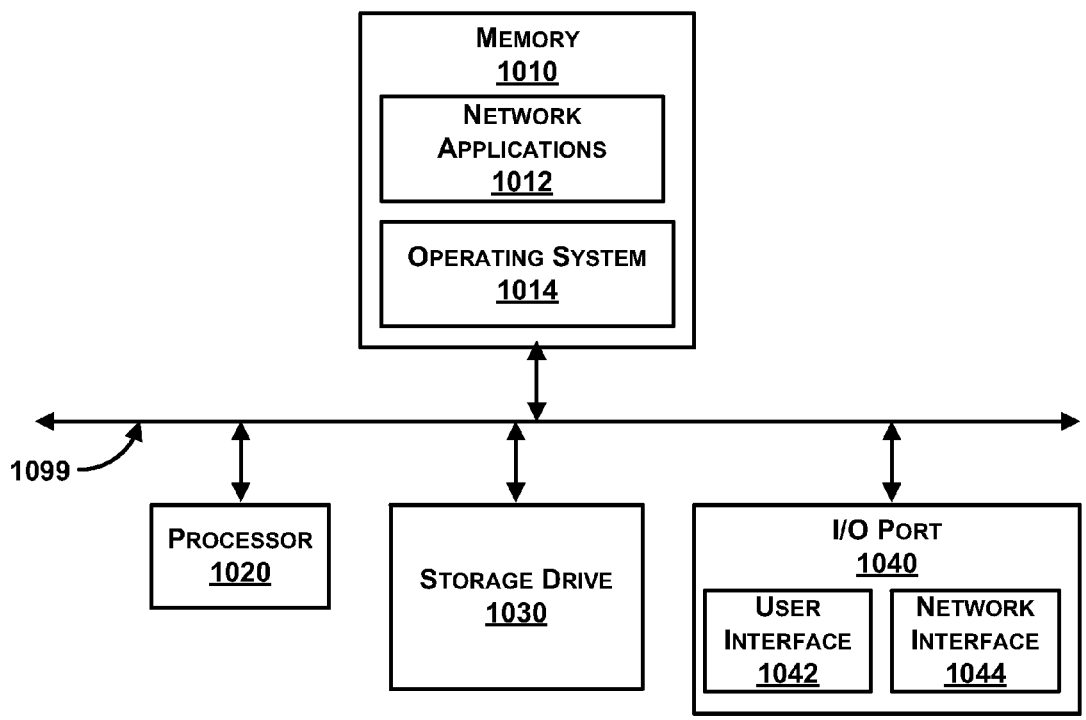
FIG. 10 is a block diagram illustrating an exemplary computing device, according to one embodiment.

FIG. 10 is a block diagram illustrating an exemplary computing device 1000 for use in the system 100 of FIG. 1, according to one embodiment. The computing device 800 is an exemplary device that is implementable for each of the components of the system 100, including the wireless device 110, the access point 120, and the controller 130. Additionally, the system 100 is merely an example implementation itself, since the system 100 can also be fully or partially implemented with laptop computers, tablet computers, smart cell phones, Internet appliances, and the like.

The computing device 1000, of the present embodiment, includes a memory 1010, a processor 1020, a hard drive 1030, and an I/O port 840. Each of the components is coupled for electronic communication via a bus 1099. Communication can be digital and/or analog, and use any suitable protocol.

The memory 1010 further comprises network applications 1020 and an operating system 1022. The network applications 1020 can include the modules of network applications, access points, or controllers as illustrated in FIGS. 7-9. Other network applications can include 10210 a web browser, a mobile application, an application that uses networking, a remote application executing locally, a network protocol application, a network management application, a network routing application, or the like.

The operating system 1022 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 1020 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 1021 can be single core, multiple core, or include more than one processing elements. The processor 820 can be disposed on silicon or any other suitable material. The processor 820 can receive and execute instructions and data stored in the memory 810 or the hard drive 1030

The storage drive 1030 can be any non-volatile type of storage such as a magnetic disc, EEPROM, Flash, or the like. The storage drive 1030 stores code and data for applications.

The I/O port 1040 further comprises a user interface 1042 and a network interface 844. The user interface 1042 can output to a display device and receive input from, for example, a keyboard. The network interface 1044 connects to a medium such as Ethernet or WiFi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for controlling uplink medium access of a plurality of wireless devices to a desired level on a per device basis while connected to access points of a wireless network with modified beacon frames, the method comprising the steps of:

determining a desired level of uplink access for a wireless device from a network perspective, based on characteristics associated with the device;

determining uplink configurations for the wireless device corresponding to the desired level of uplink access including identifying values of a Quiet element of a beacon corresponding to the uplink configurations;

associating a per-device BSSID (Basic Service Set Identifier) with the uplink configurations for the wireless device, wherein per-device BSSIDs are only assigned to a single wireless device in order to customize uplink access independently for each wireless device;

generating a modified beacon frame with the uplink configurations and the per-device BSSID to a wireless device including embedding the uplink configurations in the Quiet Element field of the beacon with the identified values;

sending the modified beacon frame with the unique BSSID and at least one other BSSID; and receiving a transmission from the wireless device that complies with the uplink configurations of the modified beacon frame.

2. The method of claim 1, wherein the embedding the uplink configurations in the Quiet Element field comprises:

determining a value for at least one of Quiet Count, Quiet Period, Quiet Duration and Quiet Offset in accordance with a desired level of uplink medium access.

3. The method of claim 1, further comprising:

embedding the uplink configurations in at least one of an EDCA Enhanced Distributed Channel Access) Parameter Set field and a CWmin (minimum Contention Window) field of the beacon.

4. The method of claim 1, wherein the embedding the uplink configurations in the at least one of the EDCA Parameter Set field and the CWmin field of the beacon comprises:

determining a value for at least one of an AIFS field and a CWmin (minimum Contention Window) field in accordance with a desired level of uplink medium access.

5. The method of claim 1, further comprising:
sending the unique BSSID to the wireless device embedded within a beacon.

6. The method of claim 1, further comprising:
receiving the uplink configurations from a controller that communicates with a plurality of access points, and at least one other access point uses the BSSID to communicate with the wireless device, the controller determining which access point to send the uplink configurations.

7. The method of claim 1, further comprising:
receiving an upload from a second wireless device;
responsive to the upload, sending a beacon frame to the second wireless device, the beacon frame comprising a BSSID that is unique to the second wireless device, and a modified beacon frame that is unique to the second wireless device, the modified beacon frame comprising data associated with unique uplink configurations that are specific to the second wireless device; and
receiving an additional upload from the second wireless device that complies with the uplink configurations of the modified beacon frame.

8. The method of claim 1, wherein the wireless device complies with a wireless protocol without native uplink transmission control.

9. The method of claim 1, wherein the wireless network comprises an IEEE 802.11 type of network.

10. The method of claim 1, further comprising:
receiving an unregulated transmission from the wireless device that is not defined by the uplink configurations,
wherein sending the uplink configurations to the wireless device is responsive to the unregulated transmission exceeding a threshold, the threshold comprising at least one of an amount of bandwidth, an amount of throughput, and a number of media accesses, and
wherein receiving the transmission from the wireless device comprises receiving a regulated transmission that is defined by the uplink configurations.

11. The method of claim 1, further comprising:
receiving an unregulated transmission from the wireless device,
wherein sending the uplink configurations to the wireless device is responsive a dynamically changing amount of unregulated network traffic exceeding a threshold that is not defined by the uplink configurations, and
wherein receiving the transmission from the wireless device comprises receiving a regulated transmission that is defined by the uplink configurations.

12. The method of claim 1, wherein the modified beacon frame comprises a field that determines an amount of time the wireless device waits before accessing the wireless network.

13. The method of claim 1, wherein the modified beacon frame comprises a field that specifies an amount of slots the wireless device waits until accessing the wireless network.

14. The method of claim 13, wherein the field also comprises a field that causes the wireless device to wait a random number of slots in addition to the specified number of slots before accessing the wireless network.

15. The method of claim 1, further comprising:
receiving commands from a controller that manages a plurality of access points including the first access point and a second access point; and
handing-off the wireless device from the first access point to the second access point, wherein the second access point sends beacons using the same device identifier, and wherein the wireless device continues to comply with the uplink configurations after the hand-off.

16. The method of claim 1, further comprising:
determining that the wireless device is a guest; and
setting the media access based on the wireless device being a guest, the media access for a guest having a different quality of service than a non-guest based on the uplink configurations.

17. A non-transitory computer-readable medium storing instructions that when executed by a processor, perform a method for controlling uplink medium access of a plurality of wireless devices to a desired level on a per device basis while connected to access points of a wireless network with modified beacon frames, the method comprising the steps of:
determining a desired level of uplink access for a wireless device from a network perspective, based on characteristics associated with the device;
determining uplink configurations for the wireless device corresponding to the desired level of uplink access including identifying values of a Quiet element of a beacon corresponding to the uplink configurations;
associating a per-device BSSID (Basic Service Set Identifier) with the uplink configurations for the wireless device, wherein per-device BSSIDs are only assigned to a single wireless device in order to customize uplink access independently for each wireless device;
generating a modified beacon frame with the uplink configurations and the per-device BSSID to a wireless device including embedding the uplink configurations in the Quiet Element field of the beacon with the identified values;
sending the modified beacon frame with the unique BSSID and at least one other BSSID; and
receiving a transmission from the wireless device that complies with the uplink configurations of the modified beacon frame.

18. An access point to control uplink medium access of a plurality of wireless devices to a desired level on a per device basis while connected to a wireless network with modified beacon frames, the access point comprising:
a processor; and
a memory, storing:
a first module to determine a desired level of uplink access for a wireless device from a network perspective, based on characteristics associated with the device;
a second module to determine uplink configurations for the wireless device corresponding to the desired level of uplink access including identifying values of a Quiet element of a beacon corresponding to the uplink configurations;
a third module to associate a per-device BSSID (Basic Service Set identifier) with the uplink configurations for the wireless device, wherein per-device BSSIDs are only assigned to a single wireless device in order to customize uplink access independently for each wireless device;
a fourth module to generate a modified beacon frame with the uplink configurations and the per-device BSSID to a wireless device including embedding the uplink configurations in the Quiet Element field of the beacon with the identified values;

a fifth module to send the modified beacon frame with the unique BSSID and at least one other BSSID; and
a sixth module to receive a transmission from the wireless device that complies with the uplink configurations of the modified beacon frame.

\* \* \* \* \*